(12) United States Patent
Eatough et al.

(10) Patent No.: US 7,293,091 B2
(45) Date of Patent: Nov. 6, 2007

(54) METHOD AND APPARATUS FOR DISRUPTION SENSITIVE NETWORK DATA MANAGEMENT

(75) Inventors: David A. Eatough, Herriman, UT (US); Peter E. Johnson, Lehi, UT (US)

(73) Assignee: Intel Corporation, Santa Clara, CA (US)

( * ) Notice: Subject to any disclaimer, the term of this patent is extended or adjusted under 35 U.S.C. 154(b) by 655 days.

(21) Appl. No.: 10/160,871

(22) Filed: May 30, 2002

(65) Prior Publication Data

US 2003/0225878 A1    Dec. 4, 2003

(51) Int. Cl.
  *G06F 15/173* (2006.01)
(52) U.S. Cl. ............ 709/226; 370/395.21; 370/395.41; 370/468
(58) Field of Classification Search ................ 709/224, 709/226, 223; 370/230, 468, 232, 312, 440, 370/235, 395, 395.41
See application file for complete search history.

(56) References Cited

U.S. PATENT DOCUMENTS

| | | | |
|---|---|---|---|
| 5,115,430 A * | 5/1992 | Hahne et al. ............... 370/440 |
| 5,805,599 A * | 9/1998 | Mishra et al. ............... 370/468 |
| 6,108,306 A * | 8/2000 | Kalkunte et al. ........... 370/235 |
| 6,262,974 B1 * | 7/2001 | Chevalier et al. .......... 370/232 |
| 6,269,078 B1 * | 7/2001 | Lakshman et al. ......... 370/230 |
| 6,285,658 B1 * | 9/2001 | Packer ....................... 370/230 |
| 6,310,857 B1 * | 10/2001 | Duffield et al. ............. 370/232 |
| 6,535,523 B1 * | 3/2003 | Karmi et al. ............... 370/468 |
| 6,594,265 B1 * | 7/2003 | Etorre et al. ........... 370/395.51 |
| 6,690,678 B1 * | 2/2004 | Basso et al. ................ 370/468 |
| 6,961,341 B1 * | 11/2005 | Krishnan .................... 370/412 |
| 7,072,344 B2 * | 7/2006 | Abdelilah et al. ..... 370/395.21 |
| 2002/0059408 A1 * | 5/2002 | Pattabhiraman et al. .... 709/223 |
| 2002/0062472 A1 * | 5/2002 | Medlock et al. ............... 716/1 |
| 2002/0174227 A1 * | 11/2002 | Hartsell et al. ............. 709/226 |
| 2005/0044206 A1 * | 2/2005 | Johansson et al. .......... 709/224 |

* cited by examiner

*Primary Examiner*—Nathan Flynn
*Assistant Examiner*—Dustin Nguyen
(74) *Attorney, Agent, or Firm*—Blakely, Sokoloff, Taylor & Zafman, LLP

(57) ABSTRACT

Numerous embodiments of a method and/or apparatus for disruption sensitive network data management are disclosed. In one particular embodiment, a determination is made of the network resources available to a computing system for exchange of data complying with a particular data protocol. A determination is then made of the network resources utilized by a computing system for exchange of data comprising a particular protocol, these two resource values are compared, and the resource allocation is altered in accordance with the comparison.

21 Claims, 2 Drawing Sheets

METHOD AND APPARATUS FOR DISRUPTION SENSITIVE NETWORK DATA MANAGEMENT

BACKGROUND

A computing system connected to a network may be executing several applications that utilize network resources, such as network bandwidth. These applications may perform electronic data exchanges, where the data exchanged complies with one or more types of data protocol. Some applications may be higher priority than other applications, and priority may be based on the type of data protocol utilized for the particular data exchange, for example. If the computing system is utilizing system management software, the software may reserve certain resources for use by these higher priority applications. Reserving resources for higher priority applications may result in lower priority applications having inadequate access to network bandwidth, when the bandwidth is needed to perform data exchanges. However, not reserving resources for use by higher priority applications may result in the resources not being available to the higher priority applications, causing interruption in higher priority data exchanges. Additionally, bandwidth usage by a computing system may be dynamic, and there may be periods of time where bandwidth is not being utilized significantly or efficiently by these higher priority applications. A need exists, therefore, for a method of managing usage of network bandwidth by a computing system in order to provide access to lower priority applications while minimizing or eliminating disruptions to higher priority applications.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Figure 1:
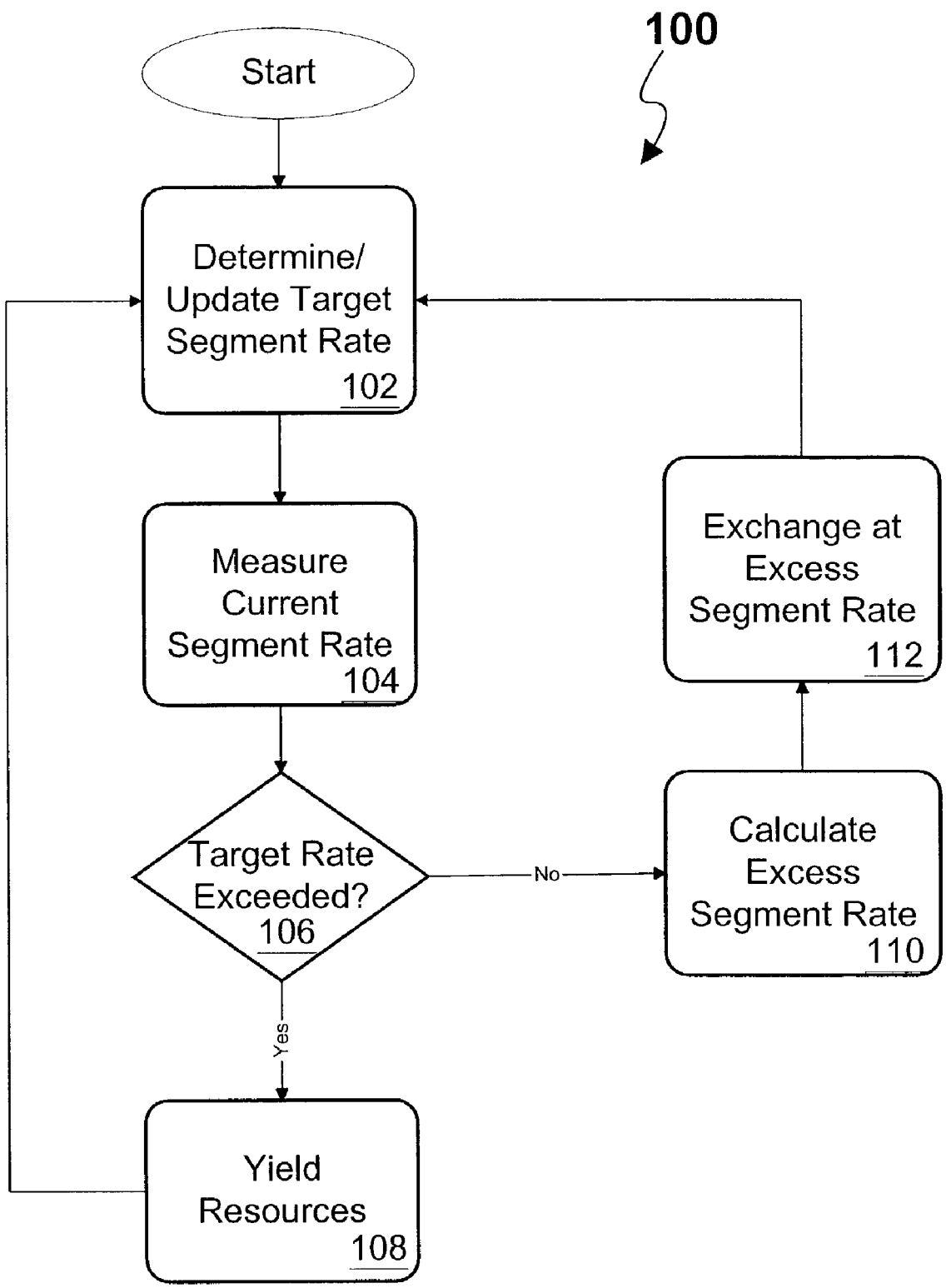
FIG. 1 is a block flow diagram illustrating the logic performed by one embodiment of the claimed subject matter.

In the following specification, numerous specific details are set forth in order to provide a thorough understanding of the claimed subject matter. However, it will be understood by those skilled in the art that the claimed subject matter may be practiced without these specific details. In other instances, well-known methods, procedures, and components will not be described in detail so as not to obscure disclosed embodiments of the claimed subject matter. Various operations are described herein as discrete steps performed in a manner that is most helpful in understanding the claimed subject matter. However, the order of presentation should not be construed as to imply that these operations are necessarily performed in the order they are presented, or even order dependent. Additionally, it is important to note that any reference in this specification to "one embodiment" or "an embodiment" means that a particular feature, structure or characteristic described in connection with the embodiment is included in at least one embodiment of the claimed subject matter. The use of the phrase "one embodiment" in more than one place in the specification does not necessarily refer to the same embodiment.

Embodiments of the claimed subject matter may manage network resources of a computing system by allocating or reserving use of resources for one or more applications on the computing system. One embodiment of the claimed subject matter may comprise a method for monitoring the actual use of network resources, where the type of use monitored may be specific to data exchanges that comply with one particular data protocol, for example, although the claimed subject matter is not so limited. After monitoring the actual use, a target use may be determined for data exchanges that comply with a particular data protocol. The actual rate may then be compared to the target rate, and use of the network resources by one or more applications may be modified in accordance with the comparison. The modified use may be an increase or decrease in the quantity of data exchanges complying with a particular data protocol, for example.

As stated previously, a computing system may be executing several applications that utilize network resources, and determining how to allocate resources may depend on several factors, such as efficiency of a particular allocation method, for example. One or more types of data management methods may be utilized by a particular computing system to allocate resources to various applications. However, resource allocation methods may not allocate resources in a particularly efficient manner. This may be due to the particular method of monitoring, which may monitor all types of data exchanges rather than specific types of data exchanges, such as only those exchanges that comply with a particular data protocol, for example. This type of monitoring may result in inefficient management, as well as interruptions to important data exchanges. Additionally, inefficiency in existing data management methods may be due, at least in part, to the dynamic nature of resource usage by a computing system and the failure to adequately account for this type of use. For example, a significant amount of resources may be required for a short period of time by a particular application, such as for a large file transfer, for example. A typical resource management method may reserve a portion of resources for a particular application, in the event that a large file transfer is initiated. Additionally, resources may be reserved for use by critical system applications, even if the critical system applications do not actively utilize the resources. System management software, such as LANDesk® Management Suite, available from Intel® Corporation, may need to allocate resources to one or more applications that may not have reserved resources but have requested resources for downloading system files, for example. It may be desirable to have the capability to monitor resource use and allocate resources without significantly interrupting other data exchanges. It may additionally be desirable to utilize resources that are not being efficiently utilized. Embodiments of the claimed subject matter may be directed to utilization of these inefficiently utilized resources, by monitoring actual resource use while minimizing or avoiding disruptions to resource use, and allocating resources in accordance with this use. In this context, an example of a high priority application may include time sensitive information such as voice information or streaming media, for example, but it is important to note that a system of priority or definition of priority levels may not be a necessary step to implementation of certain embodiments. Additionally, while allocation may be based at least in part on requests received by applications, it is not necessary that all applications that receive an allocation of resources have made a request.

In a packet-based network, electronic data is typically exchanged in the form of one or more relatively short fragments of electronic data. Fragments may include, for example, packets, segments, or frames. In this context, exchanged means sent and/or received, and the exchange of electronic data is referred to as traffic. A fragment of electronic data, in this context, may comprise a sequence of digital data pulses, with the sequence typically comprising a particular number of bits or bytes, such as 1000 bytes, for example. Electronic data typically complies with a particular data protocol, such as the transmission control protocol (TCP), as defined by the Internet Engineering Task Force (IETF) standard 7, Request For Comments (RFC) 793, adopted in September 1981 ("TCP Specification"), available at www.ietf.org, and the Ethernet protocol as defined by the Institute for Electrical and Electronics Engineers (IEEE) standard 802.3, 2000 edition ("Ethernet Specification"), available from IEEE standards, 445 Hoes Lane, P.O. Box 1331, Piscataway, N.J., 08855-1331. Additional information may be found on the World Wide Web at the following URL: http://www.ieee.org. In the context of TCP based data exchanges, TCP segments are typically equal to or less than a particular size, referred to as maximum segment size.

Referring in detail now to the figures, wherein like parts are designated by like reference numerals, there is illustrated in FIG. 1 a block flow diagram, which represents logic performed by one embodiment of the claimed subject matter. It is important to note, as an initial matter, that while certain embodiments are described primarily in reference to TCP based data exchanges, the claimed subject matter is not limited to just TCP based data exchanges. As shown in FIG. 1, programming logic 100 is described such that when executed by a processor, such as processor 202 of FIG. 2, the logical functions may be performed as described herein. It can be appreciated, however, that the sequence of the logic may be modified and still fall within the scope of the claimed subject matter. At least a portion of the programming logic may be stored on memory or data storage of a computing platform, such as memory 206 or 208, or data storage device 212 of FIG. 2, for example. Referring now to the logical functions of 100, when programming logic 100 is executed, a target segment rate may be determined at block 102. The target segment rate may be the desired segment rate, and may be determined for one particular protocol type, such as TCP segments, for example. This value of target segment rate may be determined by a number of methods or by using a number of criteria in accordance with the claimed subject matter. In one embodiment, the target segment rate of block 102 may be determined by determining the maximum number of segments, such as TCP segments, that a computing system has the capability to exchange over a particular period of time. Then, a calculation may be made of the target TCP segment rate based on this maximum value, such as 80% of the maximum TCP segment rate, for example, although the claimed subject matter is not so limited. In this particular embodiment, the maximum TCP segment rate may be determined by a number of methods, such as identifying the type of network connection or network device being utilized by a computing system. The type of network connection or network device may be determined by performing a systems check, which may identify the type of network device 220 being utilized by computing system 200, for example. It will, of course, be understood that there are other methods for determining a target segment rate, which are not described herein, but are in accordance with the claimed subject matter.

In another embodiment, the target segment rate may be determined by monitoring exchange of TCP segments by a computing system over a particular period of time, and determining or calculating the target TCP segment rate based on the monitoring. Monitoring may be performed by any number of methods, such as accessing one or more files on the computing platform such as TCP transmission statistics, which may be accessible from the operating system of the computing system. Transmission statistics may be accessed from files, including, for example, the IP helper API for Windows® systems, or the /proc/net directory for Linux systems. Any file or software that may be used to access TCP transmission statistics from such sources as the IP stack may be used in this embodiment, for example.

The current TCP segment rate may be measured or determined at block 104 of FIG. 1. This value may comprise the actual TCP segment rate achieved by the computing system executing logic 100, or may be a value based on the actual segment rate such as a modification of the actual segment rate. For example, the current segment rate may be measured by observing actual TCP segment rates over two or more time periods, and averaging these rates. Alternatively, the actual TCP segment rate of one or more of the higher priority applications may be measured, and this rate may be used as the current segment rate. Additionally, the current TCP segment rate may be determined as described in reference to functional block 102, by accessing one or more files of an operating system stored on a computing system, such as the previously described IP helper API for Windows® systems, or the /proc/net directory for Linux systems, for example. Of course, it may be desirable to use differing methods of determining the target segment rate and the current segment rate in a single embodiment, in order to obtain a differing target segment rate and a current segment rate, but, again, the invention is not so limited.

Comparison block 106 may receive the rates determined at blocks 102 and 104, and may determine if the target TCP segment rate determined at block 102 is exceeded by the current TCP segment rate determined at block 104. If comparison block 106 determines that the target segment rate was exceeded, then the resources may presently be utilized sufficiently, and at functional block 108, the resource allocation being used by the computing system may not be altered. The algorithm, however, may yield the resources for use in accordance with the existing resource allocation method being utilized by the computing system. In this particular occurrence, the logical flow may then return to block 102. At block 102, the target segment rate may be re-determined and updated in accordance with one of the previously described embodiments and the logical flow may be repeated with newer information. Alternatively, the target segment rate may not be re-determined or updated at block 102, but at block 102 the target determined in a previous execution of logic 100 may be utilized. Additionally, in alternative embodiments, the target segment rate 102 may be updated only after a particular number of cycles of the logic 100, after a particular period of time has elapsed, or after a particular event, such as the completion of a particular data exchange, for example. In these alternative embodiments, the previously determined value of target segment rate 102 may be utilized in subsequent passes through the logical flow 100. It will, however, be understood that these are exemplary embodiments of the claimed subject matter, and numerous embodiments in accordance with the claimed subject matter are not described in detail herein.

Comparison block 106 may determine that the target TCP segment rate determined at block 102 was not exceeded by the current segment rate determined at block 104. In this particular occurrence, at block 110 an excess segment rate may be calculated, which may be the quantity of available resources that may be allocated to applications that have requested resources. The excess segment rate may be determined by performing a mathematical function such as subtracting the current segment rate from the target segment rate, for example. Alternatively, the excess segment rate may be determined based on a comparison of the two segment rates and some other value, such as the size in bytes of one or more segments that a computing system may have on a queue (not shown), for example. In this embodiment the excess segment rate 110 may be matched to a segment that is queued to be exchanged, and this segment may subsequently be exchanged using at least a portion of the excess segment rate resources. It will, of course, be understood that numerous methods for determining the excess segment rate exist that are in accordance with the claimed subject matter. After the excess segment rate is determined at block 110, this value may be used to determine how much bandwidth to allocate to additional segment exchanges, and these segments may be transmitted at the excess segment rate as directed at block 112. The excess segment rate may be used to determine how much bandwidth to allocate to lower priority applications, and these applications may be registered on a queue, for example, and may be requesting use of bandwidth. It is important to note, however, that although one or more applications may be requesting use of bandwidth it is not necessary that all applications on the system request bandwidth in this embodiment. Only those applications that may be configured to be non-disruptive, that is not interrupt data transmissions of other applications, may request use of bandwidth in one embodiment of the claimed subject matter, for example. After a particular period of time, the target segment rate may be updated at block 102, and the logic 100 may be executed again, in all or in part. The logic 100 may be repeated or executed until segments that do not have adequate resources are exchanged, for example.

In particular embodiments of the claimed subject matter, a queue system may exist that may perform the functions of tracking applications that may need to utilize resources, but do not have resources allocated to them. This queue may be stored in memory 206 or 208 of system 200, for example, and the queue may be updated when transfer is complete, or when applications request resources, for example. Additionally, embodiments of the logical flow 100 may be executed when an application requests resources, and the logical flow may be executed until the application completes the exchange that the resources were requested for. Additionally, the logical flow may be initiated or overridden by a user, accessing one or more components on computing system 200 through user interface 214, for example, but in certain embodiments user intervention is not required and the methods described herein may be automated. It will, of course, be understood that these are exemplary embodiments of the claimed subject matter, and there are numerous embodiments not herein described in detail, which are in accordance with the claimed subject matter.

Figure 2:
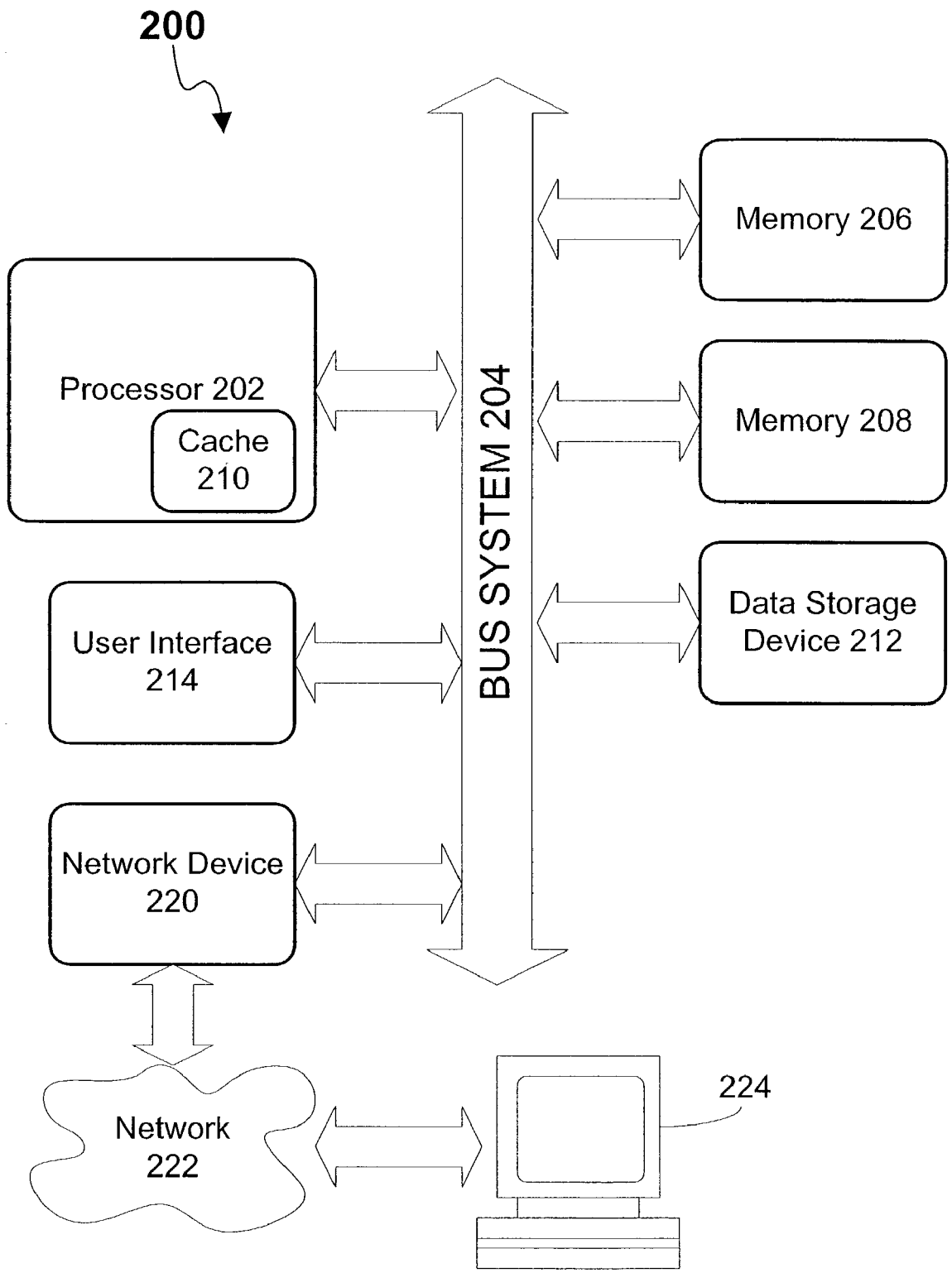
FIG. 2 is a block diagram of a system suitable for practicing one embodiment of the claimed subject matter.

A computing system capable of implementing embodiments of the claimed subject matter is described in detail in FIG. 2. Represented by this figure is a system 200 suitable for practicing one embodiment of the claimed subject matter. Initially, it is important to note that embodiments of the claimed subject matter may be implemented in hardware, firmware or software, or any combination thereof, and many of these implementations may be embodied within system 200. System 200 demonstrates a computing system, comprised of at least one processor, a data storage system, at least one input device, and at least one output device, which may be a network interface, for example. System 200 includes a processor 202 that processes data signals, and may comprise, for example, a PENTIUM®III or PENTIUM®4 microprocessor, available from Intel® Corporation. Processor 202 is coupled to a processor bus 214, which may transmit data signals to other components of the computing system 200. System 200 may comprise one or more bus systems 204. Bus system 204 may be a single bus, or a combination of multiple buses. Bus system 204 may include an I/O bus, a Peripheral Components Interconnect (PCI) bus, a Personal Computer Memory Card International Association (PCMCIA) bus, or an Industry Standard (ISA) bus, for example. Bus system 204 may provide logical connections to one or more of the components named previously. Additionally, one or more controllers (not shown) may be coupled to the one or more buses, and provide routing of data signals, for example. System 200 may include volatile and non-volatile memory, such as random access memory 206 and read only memory 208, for example. Memory 206 and/or 208 may store instructions and/or data represented by data signals, which may comprise code for performing any and/or all of the following techniques, for example. The software alternatively may be stored on a data storage device 212, includes a machine-readable medium such as, for example, a floppy disk drive, a read only memory (ROM), a CD-ROM device, a flash memory device, a digital versatile disk (DVD), or other storage device. A cache memory 210 may reside within processor 202 that stores data signals received from memory 206 and/or 208. A network device 220 may be coupled to bus system 204, and may include the ability to connect to a network. The network device may include, for example, a modem or network interface card (NIC). An input/output device 218 may be coupled to bus system 204, and may typically allow a user to gain access to one or more components of system 200. For purposes of this application, a processing system embodying components in accordance with the claimed subject matter includes any system that has a processor, such as, for example, a digital signal processor (DSP), a microcontroller, an application specific integrated circuit (ASIC), or a microprocessor. It is important to note that the claimed subject matter is not limited in scope to any particular type or category of computer network or computing system, but may be applicable to any type of electronic data exchange where management of bandwidth and data exchanges is desirable.

While certain features of the claimed subject matter have been illustrated as described herein, many modifications, substitutions, changes, and equivalents will now occur to those skilled in the art. It is, therefore, to be understood that the appended claims are intended to cover all such embodiments and changes as fall within the true spirit of the claimed subject matter.

What is claimed is:

1. A method comprising:
    determining a target segment rate of data exchanges, the determining of the target segment rate includes determining a maximum number of segments being exchanged within a computing system over a particular period of time;
    determining a current segment rate of the data exchanges, the determining of the current segment rate includes determining an average of an actual segment exchange rate within the computing system over a plurality of periods of time;

comparing the target segment rate to the current segment rate to determine an excess segment rate; and modifying use of network resources in accordance with the comparison, the modification of the network resources including determining bandwidth allocation for each of lower priority applications based on the excess segment rate and requests for bandwidth received from the low priority applications, and allocating an amount of bandwidth to each low priority application according to the bandwidth allocation;

monitoring the bandwidth allocation and the low priority applications; and registering to a queue those low priority applications that have requested the bandwidth but have not yet received the bandwidth, wherein those low priority applications includes non-disruptive applications.

2. The method of claim 1, wherein the modifying of the use of the network resources comprises modifying the use of the network resources for a portion of one or more applications that utilize the network resources.

3. The method of claim 1, wherein the target segment rate and the current segment rate comply with a particular data protocol, the particular data protocol comprises a transmission control protocol (TCP).

4. The method of claim 3, wherein the current segment rate is based on TCP-compliant segments of electronic data exchanged over a period of time.

5. The method of claim 1, wherein the target segment rate based on a type of network device.

6. The method of claim 1, wherein the current segment rate comprises a number of bits per second of data transfer that a computing device is capable of exchanging.

7. The method of claim 1, wherein the determining of the excess segment rate is performed by measuring which value of the target segment rate and the current segment rate is mathematically larger.

8. An article of manufacture comprising a machine-readable medium having instructions, which when executed, cause a machine to:

determine a target segment rate of data exchanges, the determining of the target segment rate includes determining a maximum number of segments being exchanged within a computing system over a particular period of time;

determine a current segment rate of the data exchanges, the determining of the current segment rate includes determining an average of an actual segment exchange rate within the computing system over a plurality of periods of time;

compare the target segment rate to the current segment rate to determine an excess segment rate; and modify use of network resources in accordance with the comparison, the modification of the network resources including determining bandwidth allocation for each of lower priority applications based on the excess segment rate and requests for bandwidth received from the low priority applications, and allocating an amount of bandwidth to each low priority application according to the bandwidth allocation;

monitoring the bandwidth allocation and the low priority applications; and registering to a queue those low priority applications that have requested the bandwidth but have not yet received the bandwidth, wherein those low priority applications includes non-disruptive applications.

9. The article of manufacture of claim 8, wherein the instructions when executed, further cause the machine to modify the use of the network resources comprises modifying the use of the network resources for a portion of one or more applications that utilize the network resources.

10. The article of manufacture of claim 8, wherein the target segment rate and the current segment rate comply with a particular data protocol, the particular data protocol comprises a transmission control protocol (TCP).

11. The article of manufacture of claim 10, wherein the current segment rate is based on TCP-compliant segments of electronic data exchanged over a period of time.

12. The article of manufacture of claim 8, wherein the target segment rate is based on a type of network device.

13. The article of manufacture of claim 8, wherein the current segment rate comprises a number of bits per second of data transfer that a computing device is capable of exchanging.

14. The article of manufacture of claim 8, wherein the instructions when executed to determine the excess segment rate, further cause the machine to measure which value of the target segment rate and the current segment rate is mathematically larger.

15. A system comprising:

a computer system coupled with a network having network resources, the computer system to manage the network resources for one or more applications being executed on the computer system, the computer system having a processor and a storage medium coupled with the processor, the processor to:

determining a target segment rate of data exchanges, the determining of the target segment rate includes determining a maximum number of segments being exchanged within a computing system over a particular period of time;

determining a current segment rate of the data exchanges, the determining of the current segment rate includes determining an average of an actual segment exchange rate within the computing system over a plurality of periods of time;

comparing the target segment rate to the current segment rate to determine an excess segment rate; and modifying use of the network resources in accordance with the comparison, the modification of the network resources including determining bandwidth allocation for each of lower priority applications based on the excess segment rate and requests for bandwidth received from the low priority applications, and allocating an amount of bandwidth to each low priority application according to the bandwidth allocation; and monitor the bandwidth allocation and the low priority applications; and register to a queue those low priority applications that have requested the bandwidth but have not yet received the bandwidth, wherein those low priority applications includes non-disruptive applications.

16. The system of claim 15 wherein the modifying of the use of the network resources comprises modifying the use of the network resources for a portion of one or more applications that utilize the network resources.

17. The system of claim 15, wherein the target segment rate and the current segment rate comply with a particular data protocol, the particular data protocol comprises a transmission control protocol (TCP).

18. The system of claim 17, wherein the current segment rate is based on TCP-compliant segments of electronic data exchanged over a period of time.

19. The system of claim 15, wherein the target segment rate is based on a type of network device.

20. The system of claim 15, wherein the current segment rate comprises a number of bits per second of data transfer that a computing device is capable of exchanging.

21. The system of claim 15, wherein the determining of the excess segment rate is performed by measuring which value of the target segment rate and the current segment rate is mathematically larger.

* * * * *